(12) United States Patent
Balsiger et al.

(10) Patent No.: US 10,584,782 B2
(45) Date of Patent: Mar. 10, 2020

(54) JOINED FLEX SPLINE FOR COMPOUND HARMONIC DRIVE

(71) Applicant: Hamilton Sundstrand Corporation, Windsor Locks, CT (US)

(72) Inventors: Derick S. Balsiger, Mayer, AZ (US); Nicholas R. Van De Veire, Tempe, AZ (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 709 days.

(21) Appl. No.: 15/229,951

(22) Filed: Aug. 5, 2016

(65) Prior Publication Data

US 2018/0038468 A1    Feb. 8, 2018

(51) Int. Cl.
*F16H 49/00* (2006.01)
*B64C 13/34* (2006.01)

(52) U.S. Cl.
CPC ........... *F16H 49/001* (2013.01); *B64C 13/34* (2013.01)

(58) Field of Classification Search
CPC .............................. F16H 49/001; B64C 13/34
USPC .......................................................... 74/640
See application file for complete search history.

(56) References Cited

U.S. PATENT DOCUMENTS

| 3,604,287 | A |   | 9/1971 | Humphreys |
| 4,003,272 | A | * | 1/1977 | Volkov .................. F16H 49/001 74/640 |
| 6,082,222 | A |   | 7/2000 | Kiyosawa et al. |
| 8,757,029 | B2 | * | 6/2014 | Negishi .................. B25J 9/1025 74/411 |
| 9,157,517 | B2 |   | 10/2015 | Lunin |
| 9,228,651 | B2 |   | 1/2016 | Waide |
| 9,360,098 | B2 |   | 6/2016 | Roopnarine |
| 2015/0075310 | A1 |   | 3/2015 | Lunin et al. |
| 2015/0354686 | A1 |   | 12/2015 | Balsiger |
| 2016/0010738 | A1 |   | 1/2016 | Balsiger et al. |
| 2016/0152322 | A1 |   | 6/2016 | Balsiger et al. |
| 2016/0229525 | A1 |   | 8/2016 | Van De Veire et al. |

FOREIGN PATENT DOCUMENTS

EP    2980448 A1    2/2016

OTHER PUBLICATIONS

European Search Report for Application No. 17174208.3-1762; Report dated Date: Dec. 13, 2017; Report Received Date: Dec. 14, 2017; 1-8 pages.

* cited by examiner

*Primary Examiner* — William C Joyce
(74) *Attorney, Agent, or Firm* — Cantor Colburn LLP

(57) ABSTRACT

A compound harmonic drive including: a flexible ring having an inner surface and an outer surface; a first flexible gear disposed around the outer surface of the flexible ring and coaxial to the flexible ring; a second flexible gear disposed around the outer surface of the flexible ring and coaxial to the flexible ring; a first ring gear that meshes with the first flexible gear and is coaxial to the first flexible gear; and a second ring gear that meshes with the second flexible gear and is coaxial to the second flexible gear. The first flexible gear and second flexible gear are fixedly attached to the outer surface of the flexible ring.

20 Claims, 6 Drawing Sheets

JOINED FLEX SPLINE FOR COMPOUND HARMONIC DRIVE

STATEMENT REGARDING FEDERALLY SPONSORED RESEARCH OR DEVELOPMENT

This invention was made with government support under Contract No. FA8650-15-C-2500 awarded by the United States Department of the Air Force. The government has certain rights in the invention.

BACKGROUND

The subject matter disclosed herein generally relates to flex splines, and more specifically to an apparatus and a method for providing a flex spline for use with a compound harmonic drive.

Typically, flight control surfaces on aircraft wing structures utilize actuators that are coupled to the flight control surfaces to control and guide the movement of the flight control surfaces between positions. Certain actuator applications, such as actuators for use with thin wing designs may utilize a compound harmonic drive to provide suitable gear reduction. The use of flex splines that can reduce stress and fatigue for a compound harmonic drive is desired.

SUMMARY

According to one embodiment a compound harmonic drive is provided. The compound harmonic drive including: a flexible ring having an inner surface and an outer surface; a first flexible gear disposed around the outer surface of the flexible ring and coaxial to the flexible ring; a second flexible gear disposed around the outer surface of the flexible ring and coaxial to the flexible ring; a first ring gear that meshes with the first flexible gear and is coaxial to the first flexible gear; and a second ring gear that meshes with the second flexible gear and is coaxial to the second flexible gear. The first flexible gear and second flexible gear are fixedly attached to the outer surface of the flexible ring.

In addition to one or more of the features described above, or as an alternative, further embodiments of the compound harmonic drive may include that the first ring gear includes radially-inward-extending teeth that mesh with radially-outward-extending teeth of the first flexible gear.

In addition to one or more of the features described above, or as an alternative, further embodiments of the compound harmonic drive may include that the second ring gear includes radially-inward-extending teeth that mesh with radially-outward-extending teeth of the second flexible gear.

In addition to one or more of the features described above, or as an alternative, further embodiments of the compound harmonic drive may include that the first flexible gear includes a different number of radially-outward-extending teeth than the second flexible gear.

In addition to one or more of the features described above, or as an alternative, further embodiments of the compound harmonic drive may include that the first ring gear includes a different number of radially-inward-extending teeth than the second ring gear.

In addition to one or more of the features described above, or as an alternative, further embodiments of the compound harmonic drive may include that the first ring gear or the second ring gear is grounded.

In addition to one or more of the features described above, or as an alternative, further embodiments of the compound harmonic drive may include that the first flexible gear and second flexible gear are fixedly attached to the outer surface of the flexible ring by a brazed joint.

In addition to one or more of the features described above, or as an alternative, further embodiments of the compound harmonic drive may include: a harmonic wave generator disposed radially inward from the flexible ring and engaged with the internal surface of the flexible ring. The harmonic wave generator including: a rotor element, including an outer wave profile having a plurality of lobes, and a stator element configured to drive rotation of the rotor element. The flexible ring, the first flexible gear, and the second flexible gear rotate in response to interaction between the harmonic wave generator, the flexible ring, the first flexible gear, the second flexible gear, the first ring gear, and the second ring gear when the harmonic wave generator rotates.

In addition to one or more of the features described above, or as an alternative, further embodiments of the compound harmonic drive may include that the stator element includes: a hub; a plurality of spokes extending radially outward from the hub; and conductive elements wound around the spoke to form windings.

In addition to one or more of the features described above, or as an alternative, further embodiments of the compound harmonic drive may include a bearing element radially interposed between the rotor element and the flexible ring.

According to another embodiment, a method of assembling a compound harmonic drive is provided. The method includes: positioning a first flexible gear around an outer surface of a flexible ring, the first flexible gear being coaxial to the flexible ring; positioning a second flexible gear around the outer surface of the flexible ring, the second flexible gear being coaxial to the flexible ring; fixedly attaching the first flexible gear and the second flexible gear to the outer surface of the flexible ring; positioning a first ring gear around the first flexible gear, the first ring gear meshes with the first flexible gear and is coaxial to the first flexible gear; and positioning a second ring gear around the second flexible gear, the second ring gear meshes with the second flexible gear and is coaxial to the second flexible gear.

In addition to one or more of the features described above, or as an alternative, further embodiments of the method may include: connecting the first ring gear to an output arm; and connecting the second ring gear to a ground arm.

In addition to one or more of the features described above, or as an alternative, further embodiments of the method may include that the first ring gear includes radially-inward-extending teeth that mesh with radially-outward-extending teeth of the first flexible gear.

In addition to one or more of the features described above, or as an alternative, further embodiments of the method may include that the second ring gear includes radially-inward-extending teeth that mesh with radially-outward-extending teeth of the second flexible gear.

In addition to one or more of the features described above, or as an alternative, further embodiments of the method may include that the first flexible gear includes a different number of radially-outward-extending teeth than the second flexible gear.

In addition to one or more of the features described above, or as an alternative, further embodiments of the method may include that the first ring gear includes a different number of radially-inward-extending teeth than the second ring gear.

In addition to one or more of the features described above, or as an alternative, further embodiments of the method may include that fixedly attaching further includes brazing.

In addition to one or more of the features described above, or as an alternative, further embodiments of the method may include: positioning a harmonic wave generator within the flexible ring, the harmonic wave generator being engaged with the internal surface of the flexible ring. The harmonic wave generator includes: a rotor element, including an outer wave profile having a plurality of lobes, and a stator element configured to drive rotation of the rotor element. The flexible ring, the first flexible gear, and the second flexible gear rotate in response to interaction between the harmonic wave generator, the flexible ring, the first flexible gear, the second flexible gear, the first ring gear, and the second ring gear when the harmonic wave generator rotates.

In addition to one or more of the features described above, or as an alternative, further embodiments of the method may include that the stator element further includes: a hub; a plurality of spokes extending radially outward from the hub; and conductive elements wound around the spoke to form windings.

In addition to one or more of the features described above, or as an alternative, further embodiments of the method may include positioning a bearing element radially interposed between the rotor element and the flexible ring.

Technical effects of embodiments of the present disclosure include utilizing joined flex spine in a compound harmonic drive.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

Figure 1:
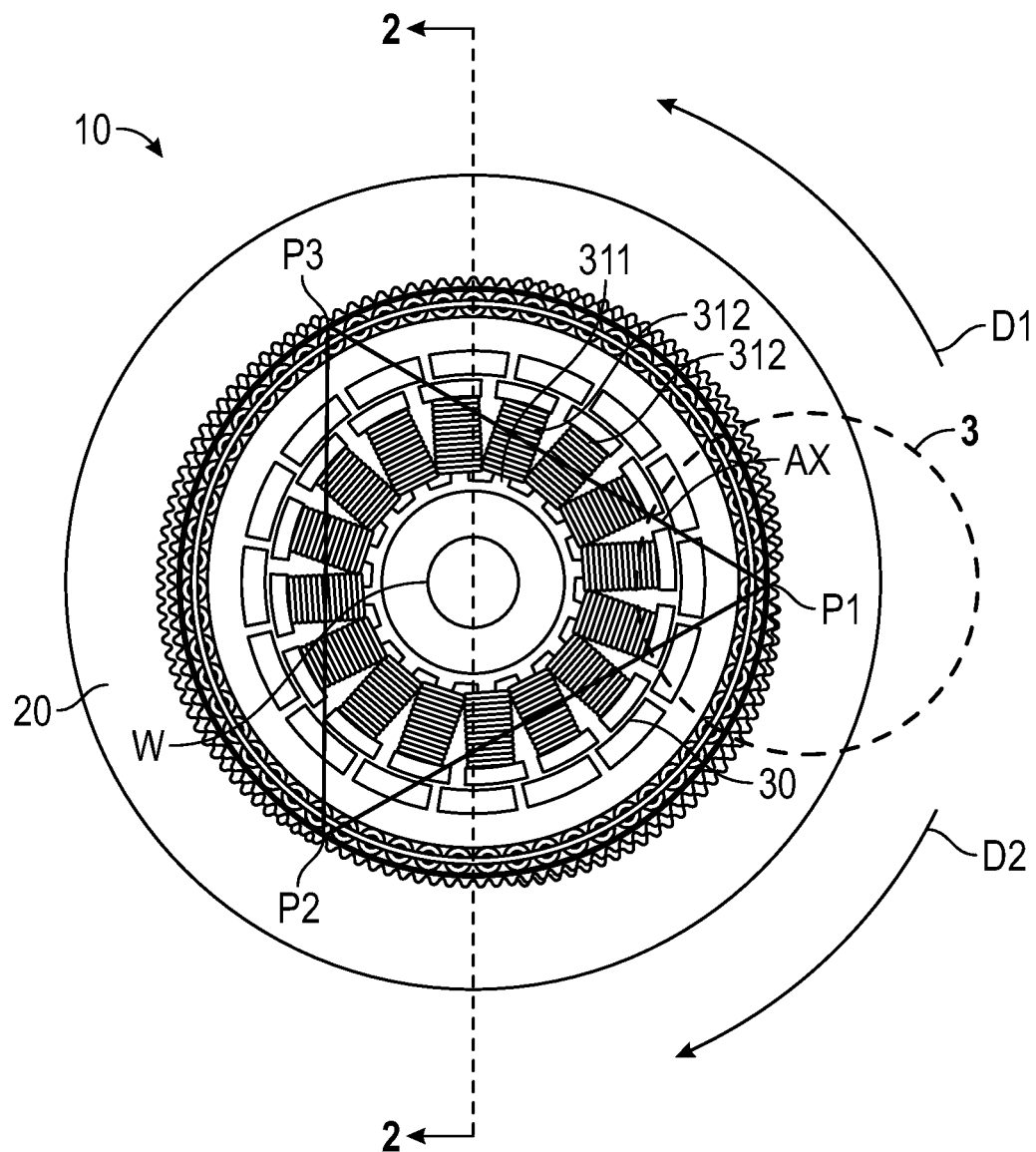
FIG. 1 is an axial view of a compound harmonic drive, according to an embodiment of the present disclosure.

The detailed description explains embodiments of the present disclosure, together with advantages and features, by way of example with reference to the drawings.

DETAILED DESCRIPTION

With reference to FIGS. 1-6, a compound harmonic drive 10 is provided and includes a harmonic ring gear 20, a harmonic wave generator 30 and a harmonic flex spline 40. The harmonic ring gear 20 includes a toothed portion 21 and disposed about a rotational axis W, with individual teeth 210 extending radially inward. The harmonic wave generator 30 is disposed about the rotational axis W and has a central radial portion 31 and an outer radial portion 32 that are separated from one another by a radial gap G. The outer radial portion 32 includes a rotor element 320 and the central radial portion includes a stator element 310. The stator element 310 is configured to drive rotation of the rotor element 320 about the rotational axis W thereby forming a configuration in which an electric motor is embedded within a harmonic drive.

The harmonic flex spline 40 is radially interposed between the harmonic ring gear 20 and the rotor element 320. The harmonic flex spline 40 may be formed of spring steel, for example, and is sized such that deflection of the harmonic flex spline 40 is less than the elastic fatigue limit of the harmonic flex spline 40 for an infinite number of deflections. The harmonic flex spline 40 includes a toothed portion 41 with individual teeth 410 extending radially outward, and a flexible ring 43 having an inner surface 43a and an outer surface 43b. The inner surface 43a of the flexible ring 43 is disposed to contact with a bearing element 42. The bearing element 42 is radially interposed between the rotor element 320 and the flexible ring 43. The inner surface 43a of the flexible ring 43 may be configured as a bearing race for the bearing element 42. The outer surface 43b of the flexible ring 43 is supportive of a first flexible gear 40a and a second flexible gear 40b, discussed further below.

The compound harmonic drive 10 may have two or more contact points. In the illustrated embodiment, the compound harmonic drive 10 has three contact points P1, P2, P3. The individual teeth 410 of the toothed portion 41 are each disposed to register with the individual teeth 210 of the toothed portion 21 at three uniformly distant contact points P1, P2 and P3 to define an equilateral triangle AX, which has a geometric center at the rotational axis W. In accordance with further embodiments, it will be understood that the individual teeth 410 of the toothed portion 41 can be disposed to register with the individual teeth 210 of the toothed portion 21 at more than three contact points. The individual teeth 210, 410 have a predefined depth such that the lobes that extend radially to define contact points P1, P2 and P3 are sized to cause the toothed portion 21 to engage the toothed portion 41.

The number of the individual teeth 410 of the toothed portion 41 is less than the number of individual teeth 210 of the toothed portion 21. This difference in the numbers of individual teeth 410, 210 defines a gear ratio of the compound harmonic drive 10 (i.e., the smaller the difference, the greater the gear ratio).

The bearing element 42 may be provided as a roller bearing 421 including an annular series of rollers attached to one another along a spline element. The bearing element 42 is configured to be rotatably supportive of the rotor element 320 within an interior region defined by the toothed portion 41.

In accordance with embodiments, the rotor element 320 includes an annular base member 321, an annular array of permanent magnetic materials 322 that are respectively coupled to an inner diameter of the annular base member 321 and an outer three-lobe wave profile 323 extending radially outward from the annular base member 321 to define respective locations of the contact points P1, P2 and P3. In accordance with further embodiments, the stator element 310 includes a hub 311 that is formed to define an aperture through which a shaft or support element may extend, a plurality of spokes 312 extending radially outward from the hub 311 and conductive elements 313 that are wound around the spokes 312 to form windings.

Figure 4:
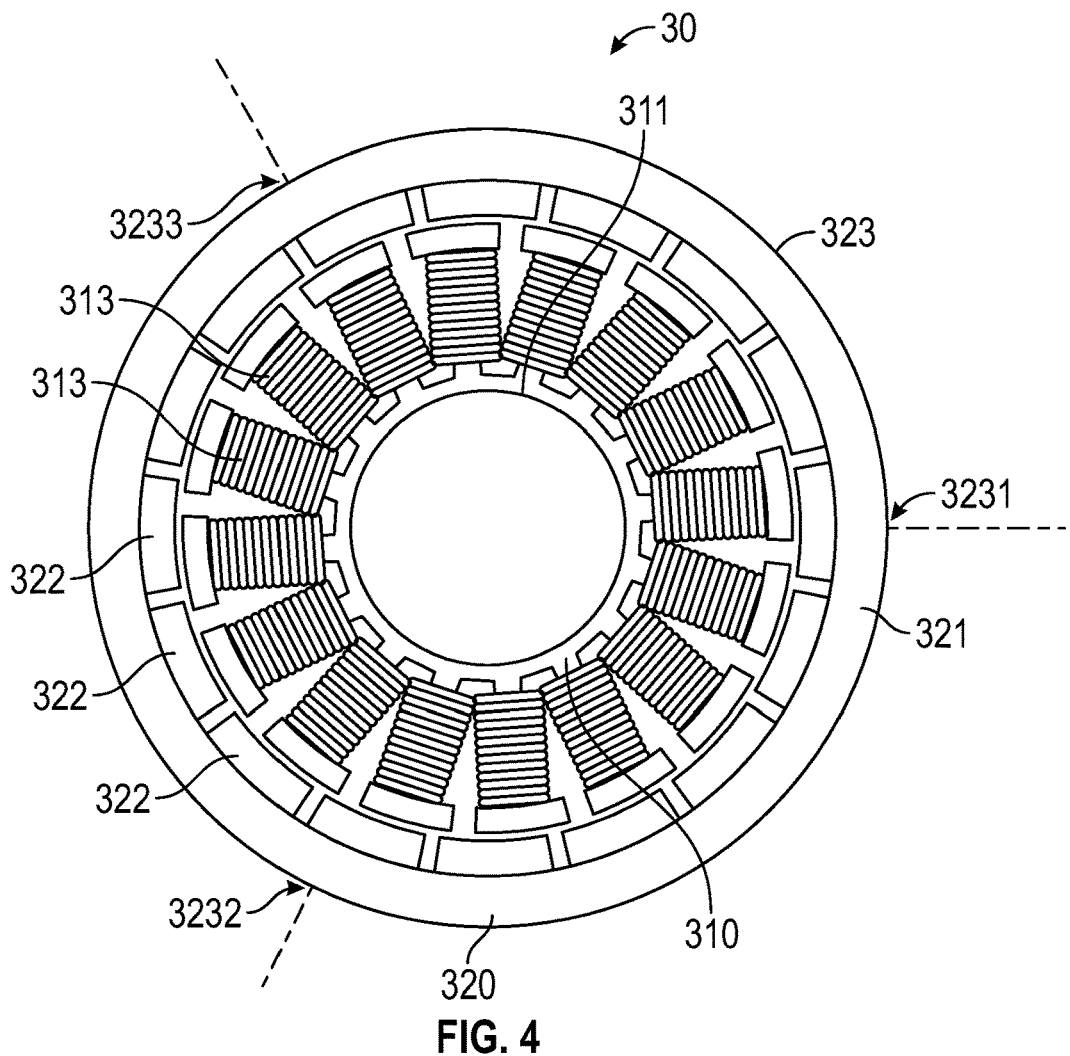
FIG. 4 is an axial view of stator and rotor elements of the compound harmonic drive of FIG. 1, according to an embodiment of the present disclosure.

As shown in FIG. 4, the outer three-lobe wave profile 323 of the rotor element 320 includes a first convex portion (or lobe) 3231, a second convex portion (or lobe) 3232 and a third convex portion (or lobe) 3233. When the harmonic wave generator 30 is activated, current is applied to the conductive elements 313 such that a flux field is generated and this flux field interacts with the permanent magnetic materials 322 to cause the rotor element 320 to rotate about the rotational axis W in a first direction D1. During such rotation, the first, second and third convex portions 3231, 3232, 3233 push outwardly against the harmonic flex spline 40 and cause the harmonic flex spline 40 to deflect radially outward such that the local individual teeth 410 register with the local individual teeth 210 to form the first, second and third contact points P1, P2 and P3, respectively. This, in turn, causes the harmonic ring gear 20 to rotate about the rotational axis W in a second direction D2, which is opposite the first direction D1. Continued rotation of the rotor element 320 in the first direction D1 thus results in continued rotation of the harmonic ring gear 20 in the second direction D2 with the difference in the numbers of the individual teeth 410, 210 defining a difference in relative rotational speeds of the rotor element 320 and the harmonic ring gear 20.

Figure 2:
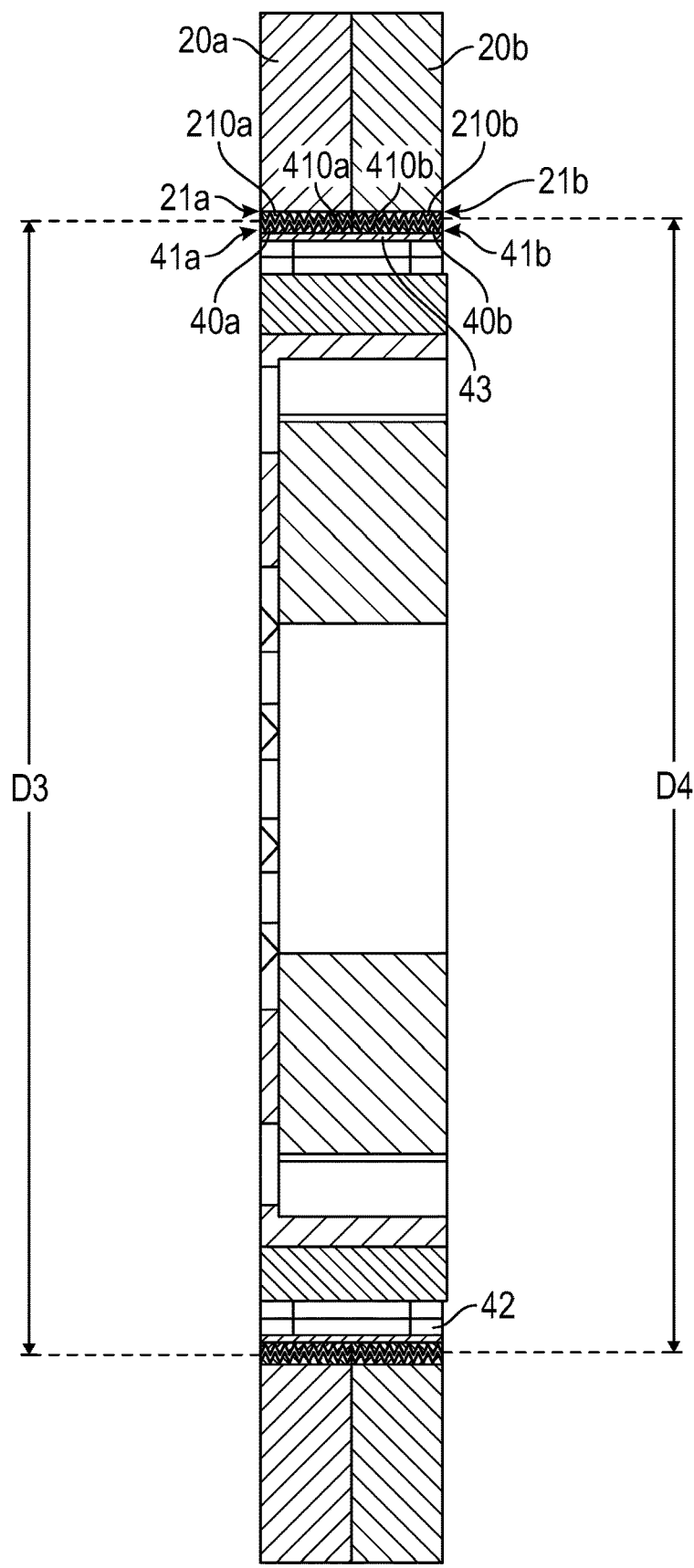
FIG. 2 is a side view of the compound harmonic drive of FIG. 1 taken along line 2-2, according to an embodiment of the present disclosure.
Figure 3:
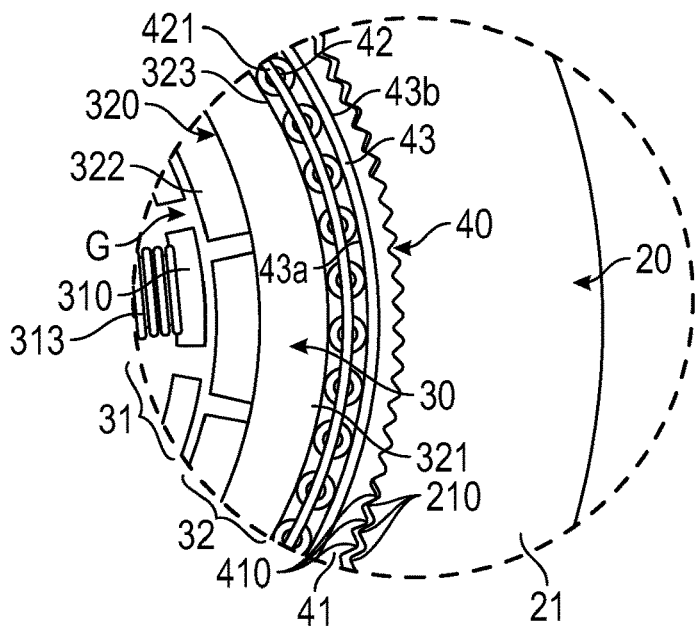
FIG. 3 is an enlarged axial view of the encircled portion of the compound harmonic drive of FIG. 1, according to an embodiment of the present disclosure.

As shown in FIG. 2, the harmonic ring gear 20 includes a first ring gear 20a and a second ring gear 20b. The first ring gear 20a and the second ring gear 20b rotate relative to each other. The first ring gear 20a may connect to an output arm 7 of the compound harmonic drive 10 and the second ring gear 20b may connect to a ground arm 6 of the compound harmonic drive 10, as discussed further below. The first ring gear 20a has a first toothed portion 21a with radially-inward-extending teeth 210a and the second ring gear 20b also has a second toothed portion 21b with radially-inward-extending teeth 210b. The first toothed portion 21a and the second toothed portion 21b together make up the toothed portion 21 discussed above. The inner diameter D3 of the first toothed portion 21a may differ from the inner diameter D4 of the second toothed portion 21b. In an embodiment, the inner diameter D3 of the first toothed portion 21a is greater than the inner diameter D4 of the second toothed portion 21b. The differences in inner diameter may allow the toothed portions 21a, 21b to differ in the number of teeth. The inner diameter D3 of the first toothed portion 21a may also be about equal to the inner diameter D4 of the second toothed portion 21b but the individual teeth 210a, 210b may vary in thickness, thus allowing the toothed portions 21a, 21b to differ in the number of teeth.

Figure 5:
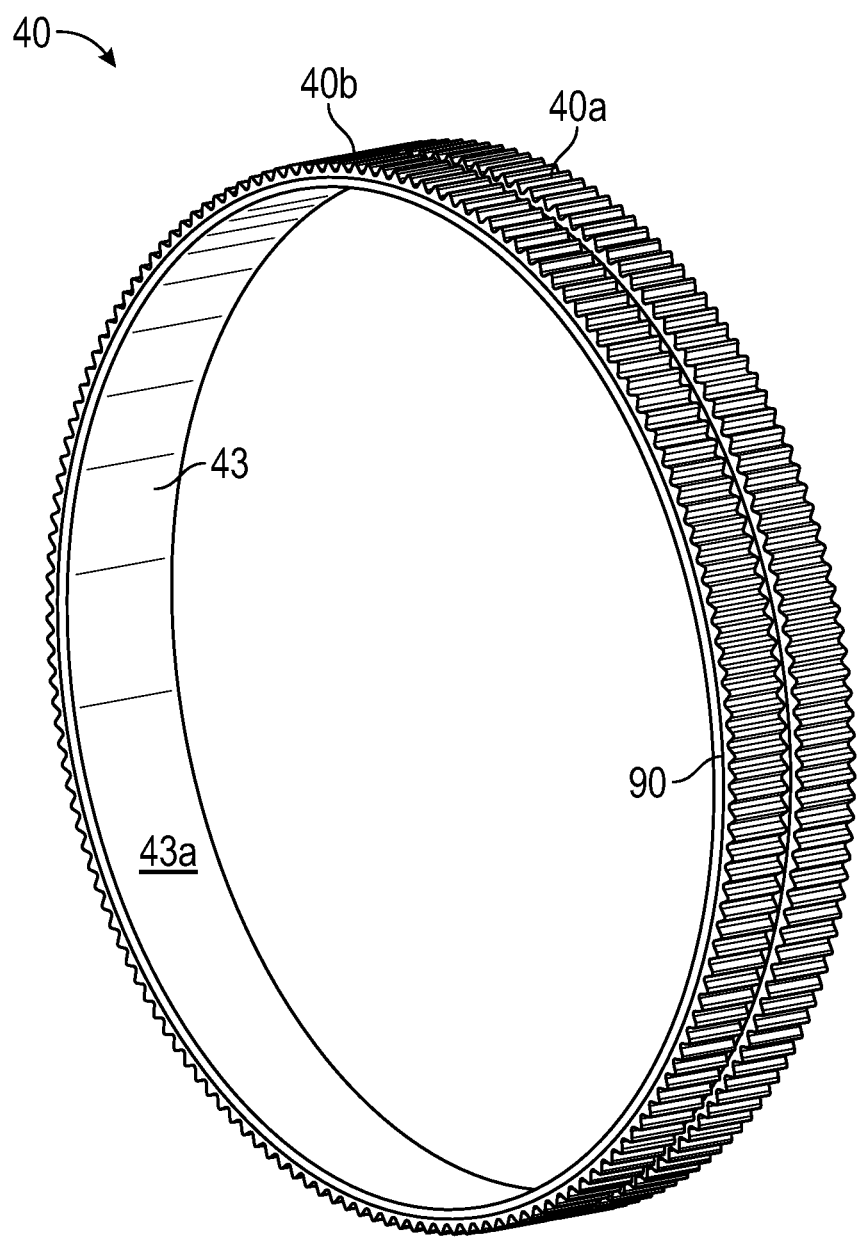
FIG. 5 is an isometric view of a flex spline of the compound harmonic drive of FIG. 1, according to an embodiment of the present disclosure.
Figure 6:
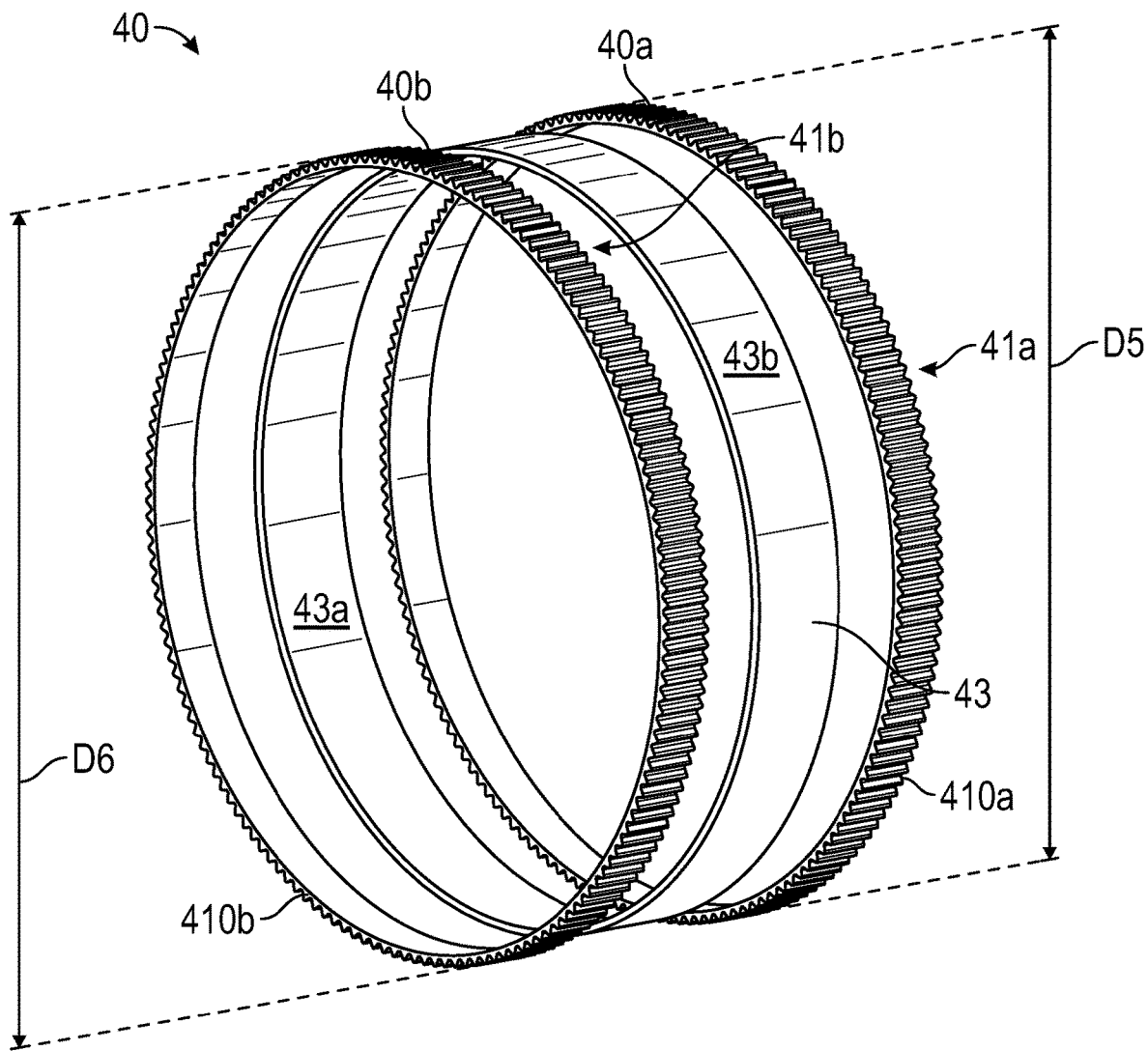
FIG. 6 is an exploded view of the flex spline of FIG. 5, according to an embodiment of the present disclosure.

As shown in FIGS. 2 and 5, the harmonic flex spline 40 may include a first flexible gear 40a, a second flexible gear 40b, and the flexible ring 43. In an embodiment, the first flexible gear 40a and the second flexible gear 40b are disposed around the flexible ring 43 and fixedly attached to the outer surface 43b of the flexible ring 43. For instance, the first flexible gear 40a and the second flexible gear 40b may be fixedly attached to the outer surface 43b of the flexible ring 43 by a brazed joint 90, as seen in FIG. 5. The first flexible gear 40a does not rotate relative to the second flexible gear 40b. The first flexible gear 40a has first toothed portion 41a with radially-outward-extending teeth 410a and the second flexible gear 40b also has a second toothed portion 41b with radially-outward-extending teeth 410b.

The first toothed portion 41a and the second toothed portion 41b together make up the toothed portion 41 discussed above. The outer diameter D5 of the first toothed portion 41a may differ from the outer diameter D6 of the second toothed portion 41b. In an embodiment, the outer diameter D5 of the first toothed portion 41a is greater than the outer diameter D6 of the second toothed portion 41b. The differences in outer diameter may allow the toothed portions 41a, 41b to differ in the number of teeth. The outer diameter D5 of the first toothed portion 41a may also be about equal to the outer diameter D6 of the second toothed portion 41b but the individual teeth 410a, 410b may vary in thickness, thus allowing the toothed portions 41a, 41b to differ in the number of teeth. Advantageously, by keeping the outer diameter D5 of the first toothed portion 41a about equal to the outer diameter D6 of the second toothed portion 41b, the first flexible gear 40a and the second flexible gear 40b see similar flexural stresses and also have similar fatigue stresses. The first toothed portion 41a of the first flexible gear 40a meshes with the first toothed portion 21a of the first ring gear 20a and the second toothed portion 41b of the second flexible gear 40b meshes with the second toothed portion 21b of the second ring gear 20b. The flexible ring 43, the first flexible gear 40a, and the second flexible gear 40b rotate in response to interaction between the harmonic wave generator 30, the flexible ring 43, the first flexible gear 40a, the second flexible gear 40b, the first ring gear 20a, and the second ring gear 20b when the harmonic wave generator 30 rotates.

The first flexible gear 40a, the second flexible gear 40b, and the flexible ring 43 may be made from relatively thin sheets of spring steel, or any other material with properties similar to spring steel. Because the first flexible gear 40a, the second flexible gear 40b, and the flexible ring 43 can be made from spring steel, the first flexible gear 40a, the second flexible gear 40b, and the flexible ring 43 are relatively thin, flexible, and elastic. The nature of the compound harmonic drive 10 creating a high ratio drive with fewer components is the factor in the size and torque to weight ratio. The thin sections of the first flexible gear 40a, the second flexible gear 40b, and the flexible ring 43 is currently a requirement for a compound harmonic drive 10 to function within fatigue limits for the each of the first flexible gear 40a, the second flexible gear 40b, and the flexible ring 43. The first flexible gear 40a, the second flexible gear 40b, and the flexible ring 43 may each be made thicker utilizing a material that could flex repeatedly, have a hard surface, and have a high enough yield stress. Further, by separating the harmonic flex spline 40 in to three separate components including the first flexible gear 40a, the second flexible gear 40b, and the flexible ring 43, each of the components may be composed from a different materials, thus allowing a wider range of options in material selection for the harmonic flex spline 40. For instance, the teeth of the first flexible gear 40a and the second flexible gear 40b may require a material having additional hardness, while flexible ring 43 does not require additional hardness, thus leading to different material selections. Further, the teeth of the first flexible gear 40a and the second flexible gear 40b may require different a different hardness thus leading to different materials between the first flexible gear 40a and the second flexible gear 40b.

In the illustrated embodiment, the compound harmonic drive 10 includes at least one first ring gear 20a to mesh with the first flexible gear 40a. In certain embodiments, the compound harmonic drive 10 can include multiple first ring gears 20a corresponding to multiple first flexible gears 40a. In certain embodiments, the compound harmonic drive 10 can include multiple second ring gears 20b corresponding to multiple second flexible gears 40b. In the illustrated embodiment, the second ring gear 20b is connected to a ground via the ground arm 6, which remains stationary relative to the compound harmonic drive 10, discussed further below. In the illustrated embodiment, the first ring gear 20a is coupled to the output arm 7 to provide the rotational output of the compound harmonic drive 10, discussed further below.

Figure 7:
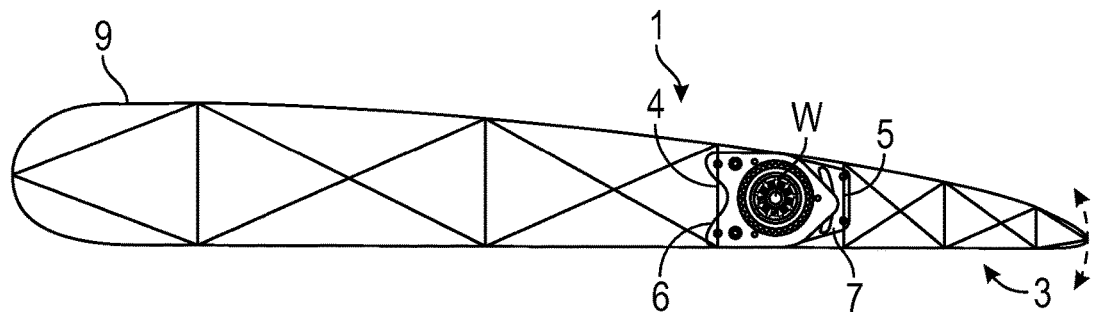
FIG. 7 is a side view of an airfoil structure that may incorporate embodiments of the present disclosure.

With reference to FIG. 7, the compound harmonic drive 10 of FIG. 2 may be operably disposed in a flight control system 1 of an aircraft or a rotorcraft. That is, in a case in which an aircraft includes a fixed aircraft structure, such as a wing 9 and a movable flight control surface such as an aileron 3, the compound harmonic drive 10 may be disposed at a coupling of the wing 9 and the aileron 3 and may be configured to control a pivoting of the aileron 3 relative to the wing 9. As shown in FIG. 7, the wing 9 includes a wing spar 4 to which a ground arm 6 of the stator element 310 of the compound harmonic drive 10 is connected and the aileron 3 includes an aileron spar 5, which is connected to an output arm 7 of the harmonic ring gear 20 of the compound harmonic drive 10. The wing 9 may further include bearings disposed to maintain an axial position of the compound harmonic drive 10. More particularly, the wing 9 may include bearings disposed to maintain relative axial positions of the harmonic ring gear 20, the harmonic wave generator 30 and the harmonic flex spline 40.

With the aileron 3 in a zero-pivot condition, respective upper and lower surfaces of the wing spar 4 and the aileron spar 5 are aligned. However, when the harmonic wave generator 30 is activated, the rotor element 320 may be driven in one of two pivoting directions. This driving of the rotor element 320 causes the harmonic ring gear 20 to rotate about the rotational axis W and, in turn, the rotation of the harmonic ring gear 20 is transmitted to the aileron spar 5 via the output arm 7 to thereby cause the aileron spar 5 to pivot about the aileron pivot axis. In accordance with embodiments, the aileron pivot axis may be defined coaxially with the rotational axis W. The pivoting of the aileron spar 5 can be in positive or negative directions in accordance with flight conditions of the associated aircraft. It should be understood that other flight control surfaces, such as elevators, rudders, slats, spoilers, etc., can be controlled using the compound harmonic drive 10.

In the illustrated embodiment, the second ring gear 20b is coupled to the ground arm 6 and the first ring gear 20a is coupled to the output arm 7. During operation, the first flexible gear 40a and the second flexible gears 40b work together along with the first ring gear 20a and the second ring gear 20b as a compact compounded gear drive to step down the rotational input of the harmonic wave generator 30. Advantageously, the compound harmonic drive 10 is simple and compact, yet maintains a relatively high gear ratio and relatively high torque-to-weight ratio. In certain embodiments, the compound harmonic drive 10 can be utilized in space limited applications such as control surface actuation in thin wing design aircrafts.

Figure 8:
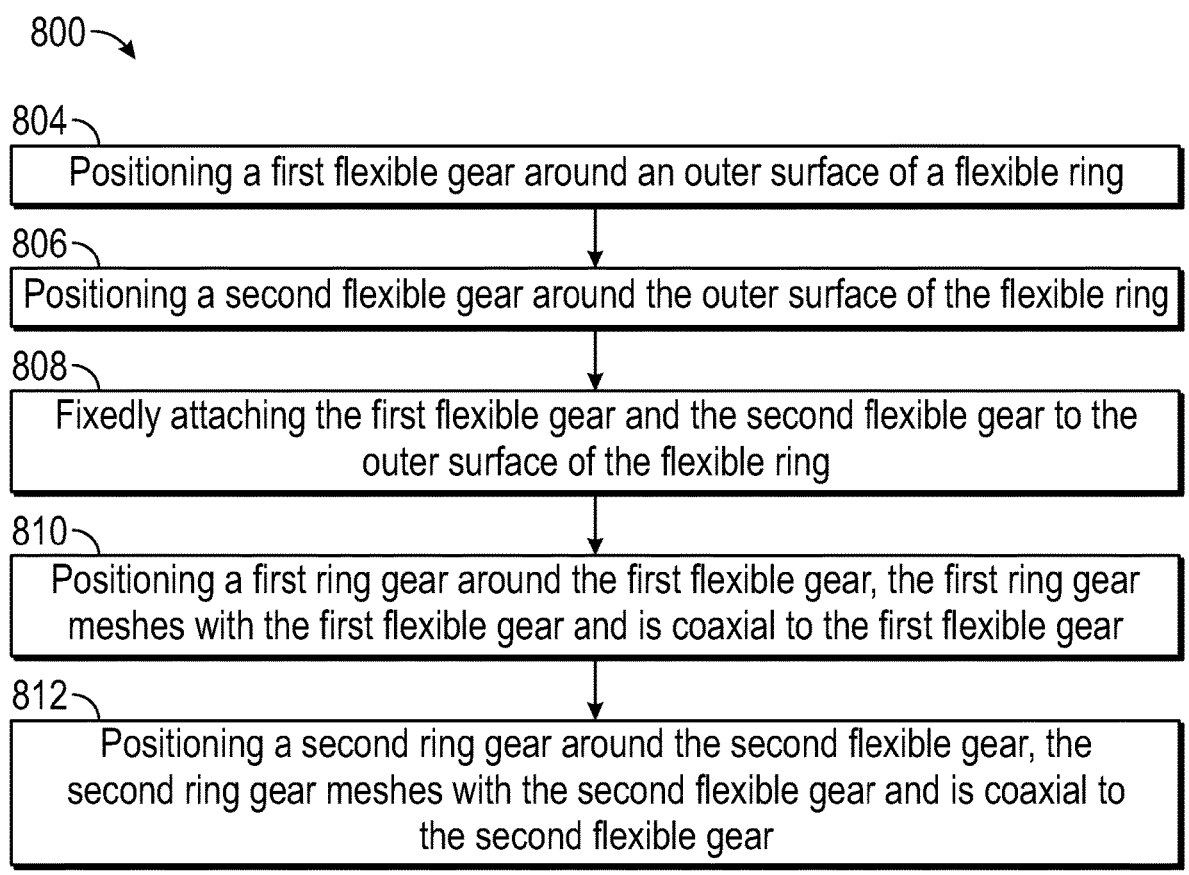
FIG. 8 is a flow process illustrating a method of assembling the compound harmonic drive of FIGS. 1-7, according to an embodiment of the present disclosure.

Referring now to FIG. 8, while referencing components of the compound harmonic drive 10 of FIGS. 1-7, FIG. 8 shows a flow process illustrating a method 800 of assembling the compound harmonic drive 10 of FIGS. 1-7, according to an embodiment of the present disclosure. At block 804, the first flexible gear 40a is positioned around the outer surface 43b of the flexible ring 43. As mentioned above, the first flexible gear 40a is coaxial to the flexible ring 43. At block 806, the second flexible gear 40b is positioned around the outer surface 43b of the flexible ring 43. As mentioned above, the second flexible gear 40b may abut the first flexible gear 40a and the second flexible gear 40b is coaxial with the flexible ring 43. At block 808, the first flexible gear 40a and the second flexible gear 40b are fixedly attached to the outer surface 43b of the flexible ring 43. As mentioned above, the first flexible gear 40a and the second flexible gear 40b may be fixedly attached to the outer surface 43b of the flexible ring 43 by a brazing to form brazed joint 90.

Further, at block 810, the first ring gear 20a is positioned around the first flexible gear 40a. As mentioned above, the first ring gear 20a meshes with the first flexible gear 40a and is coaxial to the first flexible gear 40a. At block 812, the second ring gear 20b is positioned around the second flexible gear 40b. As mentioned above, the second ring gear 20b meshes with the second flexible gear 40b and is coaxial to the second flexible gear 40b.

The method 800 may also include that the harmonic wave generator 30 is positioned within the flexible ring 43. As discussed above, the harmonic wave generator 30 is engaged with the internal surface 43a of the flexible ring 43 and comprises: the rotor element 320, including an outer wave profile having a plurality of lobes, and a stator element 310 configured to drive rotation of the rotor element 320. Additionally, the method may include that the first ring gear 20a is connected to the output arm 7 and the second ring gear 20b is connected to the ground arm 6. The method 800 may also include positioning the bearing element 42 radially interposed between the rotor element 320 and the flexible ring 43.

While the above description has described the flow process of FIG. 8 in a particular order, it should be appreciated that unless otherwise specifically required in the attached claims that the ordering of the steps may be varied.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A compound harmonic drive, comprising:
    a flexible ring having an inner surface and an outer surface;
    a first flexible gear disposed around the outer surface of the flexible ring and coaxial to the flexible ring;
    a second flexible gear disposed around the outer surface of the flexible ring and coaxial to the flexible ring;
    a first ring gear that meshes with the first flexible gear and is coaxial to the first flexible gear; and
    a second ring gear that meshes with the second flexible gear and is coaxial to the second flexible gear,
    wherein the first flexible gear and the second flexible gear are brazed to the outer surface of the flexible ring,
    wherein the first flexible gear, the second flexible gear, and the flexible ring are three separate components that are brazed together.

2. The compound harmonic drive of claim 1, wherein the first ring gear includes radially-inward-extending teeth that mesh with radially-outward-extending teeth of the first flexible gear.

3. The compound harmonic drive of claim 2, wherein the second ring gear includes radially-inward-extending teeth that mesh with radially-outward-extending teeth of the second flexible gear.

4. The compound harmonic drive of claim 3, wherein the first flexible gear includes a different number of radially-outward-extending teeth than the second flexible gear.

5. The compound harmonic drive of claim 3, wherein the first ring gear includes a different number of radially-inward-extending teeth than the second ring gear.

6. The compound harmonic drive of claim 3, further comprising:
a harmonic wave generator disposed radially inward from the flexible ring and engaged with the internal surface of the flexible ring, the harmonic wave generator comprising: a rotor element, including an outer wave profile having a plurality of lobes, and a stator element configured to drive rotation of the rotor element; and
wherein the flexible ring, the first flexible gear, and the second flexible gear rotate in response to interaction between the harmonic wave generator, the flexible ring, the first flexible gear, the second flexible gear, the first ring gear, and the second ring gear when the harmonic wave generator rotates.

7. The compound harmonic drive according to claim 6, wherein the stator element comprises:
a hub;
a plurality of spokes extending radially outward from the hub; and
conductive elements wound around the spoke to form windings.

8. The compound harmonic drive according to claim 6, further comprising:
a bearing element radially interposed between the rotor element and the flexible ring.

9. The compound harmonic drive of claim 1, wherein the first ring gear or the second ring gear is grounded.

10. The compound harmonic drive of claim 1, wherein the first flexible gear and the second flexible gear are each separately brazed to the outer surface of the flexible ring.

11. A method of assembling a compound harmonic drive, the method comprising:
positioning a first flexible gear around an outer surface of a flexible ring, the first flexible gear being coaxial to the flexible ring;
positioning a second flexible gear around the outer surface of the flexible ring, the second flexible gear being coaxial to the flexible ring;
brazing the first flexible gear and the second flexible gear to the outer surface of the flexible ring;
positioning a first ring gear around the first flexible gear, the first ring gear meshes with the first flexible gear and is coaxial to the first flexible gear; and
positioning a second ring gear around the second flexible gear, the second ring gear meshes with the second flexible gear and is coaxial to the second flexible gear,
wherein the first flexible gear, the second flexible gear, and the flexible ring are three separate components that are brazed together.

12. The method of claim 11, further comprising:
connecting the first ring gear to an output arm; and
connecting the second ring gear to a ground arm.

13. The method of claim 11, wherein the first ring gear includes radially-inward-extending teeth that mesh with radially-outward-extending teeth of the first flexible gear.

14. The method of claim 13, wherein the second ring gear includes radially-inward-extending teeth that mesh with radially-outward-extending teeth of the second flexible gear.

15. The method of claim 14, wherein the first flexible gear includes a different number of radially-outward-extending teeth than the second flexible gear.

16. The method of claim 14, wherein the first ring gear includes a different number of radially-inward-extending teeth than the second ring gear.

17. The method of claim 11, further comprising:
positioning a harmonic wave generator within the flexible ring, the harmonic wave generator being engaged with the internal surface of the flexible ring, wherein the harmonic wave generator comprises: a rotor element, including an outer wave profile having a plurality of lobes, and a stator element configured to drive rotation of the rotor element; and
wherein the flexible ring, the first flexible gear, and the second flexible gear rotate in response to interaction between the harmonic wave generator, the flexible ring, the first flexible gear, the second flexible gear, the first ring gear, and the second ring gear when the harmonic wave generator rotates.

18. The method of claim 17, wherein the stator element comprises:
a hub;
a plurality of spokes extending radially outward from the hub; and
conductive elements wound around the spoke to form windings.

19. The method of claim 17, further comprising:
positioning a bearing element radially interposed between the rotor element and the flexible ring.

20. The method of claim 11, wherein the first flexible gear and the second flexible gear are each separately brazed to the outer surface of the flexible ring.

* * * * *